Figure 1:
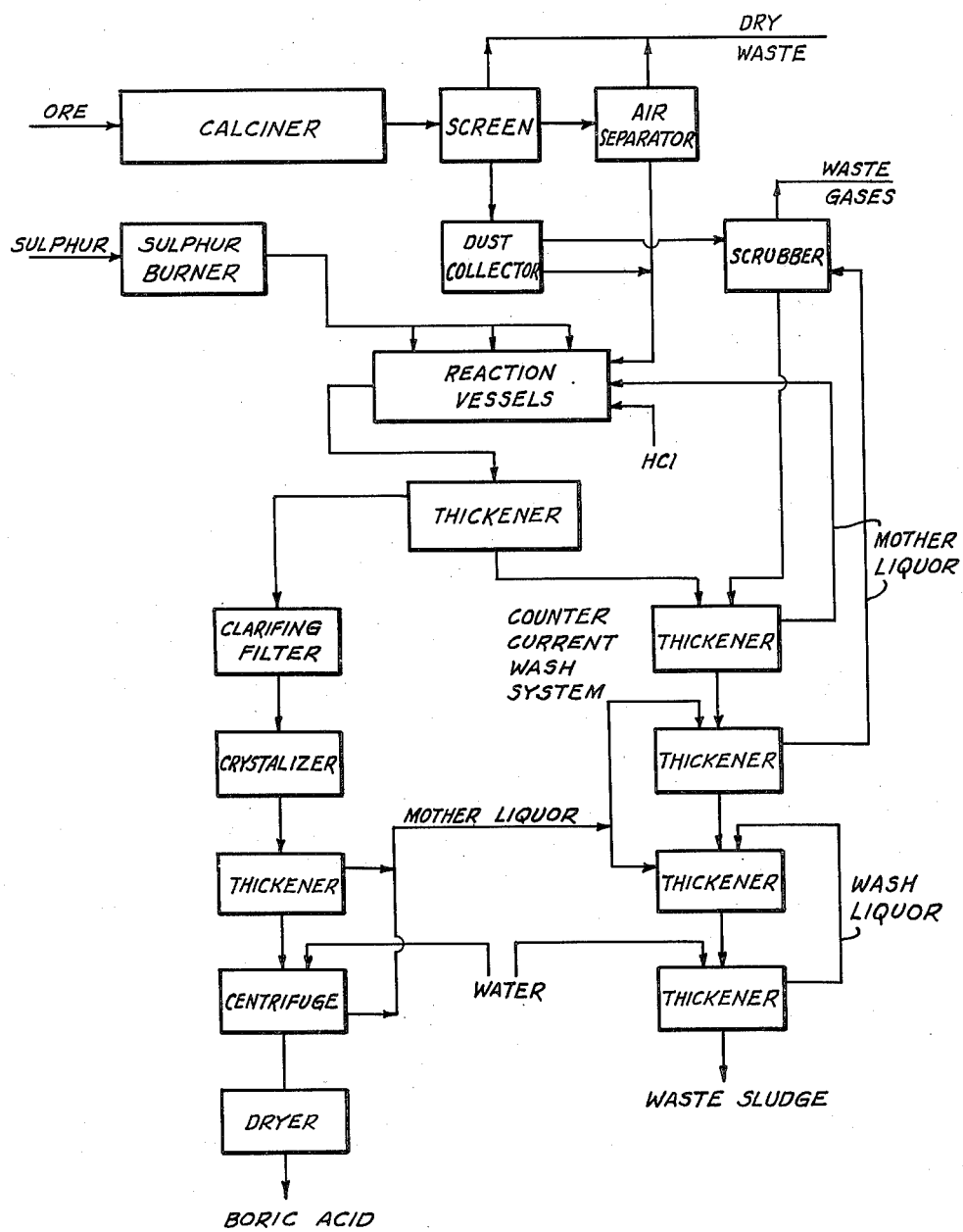

Patented Nov. 21, 1950

2,531,182

UNITED STATES PATENT OFFICE 2,531,182

PROCESS FOR THE MANUFACTURE OF BORIC ACID

James Wiseman, Westend Calif., assignor to West End Chemical Company, a corporation of California Application July 21, 1947, Serial No. 762,499

5 Claims. (Cl. 23—149)

This invention relates to the manufacture of boric acid from ores containing a metallic borate and which, in the presence of water and upon the addition of sulphur dioxide, form a relatively insoluble sulphite and boric acid. A typical ore to which the present invention is particularly suited in practice is that known as colemanite. This is recovered from natural deposits as a crude material containing calcium borate, $Ca_2B_6O_{11} \cdot 5H_2O$. The raw ore, as usually received from the mine, may contain from 18% to 20% of $B_2O_3$. One process which has been suggested included calcining the ore to drive off some of the water present, the calcined material being screened, the larger particles, usually made up of clay, rocks and the like, being separated. The calcined colemanite was then made up in a slurry with water and sulphur dioxide added. The colemanite is slightly soluble in water and reacts with the sulphur dioxide to form relatively insoluble sulphite and boric acid in accordance with the following reaction:

Reaction 1

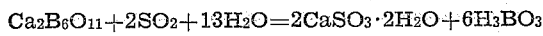

This is an equilibrium reaction which is reversible at about 70° C., the boric acid reacting with the calcium sulphite to release sulphur dioxide. This process has never been adopted commercially, probably because of the objectionable release of the sulphur dioxide. I have made certain discoveries which obviate the various objectionable features of the suggested use of sulphur dioxide and make the process feasible for use on a commercial scale.

Colemanite can be considered as having the formula $(CaO)_2(B_2O_3)_3$. I have found that a small amount of calcium oxide in solution in the boric acid solution will greatly increase the amount of $B_2O_3$ that will dissolve in the solution. For example, the amount of $B_2O_3$ in a saturated solution of pure boric acid at 30° C. is only about 34 grams per liter. However, in the presence of a small amount of CaO, the amount of $B_2O_3$ at the same temperature can be increased to as much as 140 grams per liter; such a solution is not very stable and will precipitate calcium metaborate upon standing or boiling.

I have discovered that by maintaining the solution or slurry undergoing treatment with the sulphur dioxide at a fairly acid pH, usually between 5.5 and 4.5, as is presently set forth, the CaO concentration in the solution can be controlled. This is of importance because it enables the amount of $B_2O_3$ in solution to be controlled and to be carried to a relatively high value.

One of the objections to the use of sulphur dioxide in the manufacture of boric acid by the processes suggested heretofore is that such solutions liberate sulphur dioxide freely, particularly as the temperature of the solution is increased. The objections to this are such as to have prevented the use of sulphur dioxide as an acidifying medium even though it is much cheaper than sulphuric acid. I have discovered that the pH of the reacting slurry or solution can be controlled to give practically complete recovery of the $B_2O_3$ as boric acid from the colemanite and, at the same time, to ensure that the solution undergoing treatment has but little, if any, odor of sulphur dioxide. Thus, I am enabled to work at relatively elevated temperatures of around 70° C., separating the hot liquid from the waste solids to recover a boric acid solution from which the boric acid can be subsequently recovered as such upon cooling. In addition, the end or mother liquor can be re-used to make up the starting slurry or solution.

I have found that by adding a small amount of certain acids to the solution so that the acid is available during the sulphur dioxide addition, then the solution does not release sulphur dioxide. The acid employed should be one which forms a calcium salt which is soluble in the slurry or liquor to be treated with sulphur dioxide; one need not add the acid as such to the liquor and one can add any salt of a suitable acid providing the anionic portion forms a sulphite which is relatively insoluble in the liquor or slurry. As suitable inorganic acids one can employ nitric or hydrochloric acid while as organic acids one can utilize such acids as acetic. In place of utilizing an acid as such, one can utilize as an equivalent any salt of these provided the basic portion of such salt forms a sulphite which is relatively insoluble in the slurry or solution; thus one can utilize as equivalent sources of nitric and hydrochloric acid such salts as calcium chloride, calcium nitrate, magnesium chloride or magnesium nitrate. Since calcium is present in the ore with which I am particularly concerned, it is more feasible to use this as the basic salt providing material. The effect of the addition of the acid or the salt providing the acid is to reduce the quantity of sulphite ion in solution:

Reaction 2

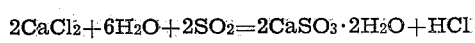

The above reaction is an equilibrium reaction and does not go to completion; its effect is to reduce the amount of sulphur dioxide in solution and hence the vapor pressure of this with an increase in absorption efficiency and reduction in odor nuisance. As the sulphur dioxide dissolves in the slurry, it forms calcium sulphite which precipitates and hydrochloric acid which reacts with the calcium borate present to liberate additional boric acid and form additional calcium chloride.

Reaction 3

$$Ca_2B_6O_{11} + 4HCl + 7H_2O = 2CaCl_2 + 6H_3BO_3$$

Adding Reaction 2 and Reaction 3, one obtains, as a summation,

Reaction 4

$$2CaCl_2 + 6H_2O + 2SO_2 = 2CaSO_3 \cdot 2H_2O + 4HCl$$

$$Ca_2B_6O_{11} + 7H_2O + 4HCl = 2CaCl_2 + 6H_3BO_3$$

$$Ca_2B_6O_{11} + 13H_2O + 2SO_2 = 2CaSO_3 \cdot 2H_2O + 6H_3BO_3$$

From this it is evident that, as is actually found in practice, the hydrochloric acid, nitric acid or other acid, or their equivalent salts, are not used up in the process and, in this respect, their effect can be compared to that of a catalyst, although they would seem to take a more direct and active part in the operation than is usually ascribed to a catalyst according to some definitions of this term. I have found that the solution should contain usually about 15 grams per liter of calcium chloride or 5 grams per liter of hydrochloric acid or equivalent. The quantity is not critical although one should usually employ more than about 5 grams per liter of calcium chloride or equivalent; an excess does not interfere with the operation although such use may be uneconomical.

It is an object of the present invention to provide an improved process for the manufacture of boric acid from colemanite utilizing sulphur dioxide.

Another object of the invention is to reduce the excess amount of sulphur dioxide present during the reaction by the use of calcium chloride or an equivalent material.

Another object of the present invention is to provide an improved process of a cyclic nature for the recovery of boric acid from a colemanite ore.

The invention includes other objects and features of advantage, some of which, together with the foregoing, will appear hereinafter wherein the present preferred process of my invention is disclosed.

In the drawing accompanying and forming a part hereof, Figure 1 is a diagrammatic flow sheet showing a continuous cyclic process for the practice of the present invention.

Figure 2:
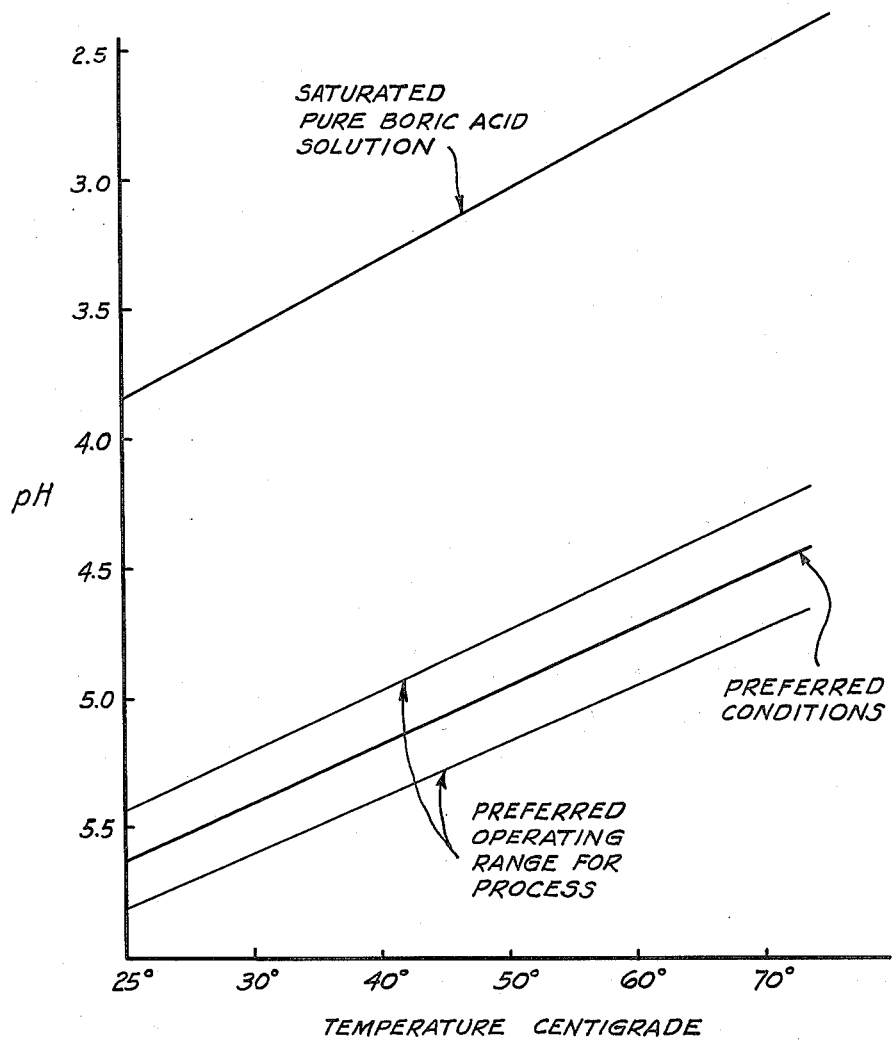

Figure 2 is a diagram showing the relation between the pH value to be maintained and the temperature.

As is shown in the flow sheet, raw colemanite ore, as received from the mine, was crushed to about a one-inch size and was then calcined, care being taken to ensure that all of the ore was calcined and that it was not heated to above the fusing point of colemanite, e. g., 1100° F. The heated colemanite was then run over a screen, the plus 10 mesh material was discarded as waste. The minus 10 mesh material was run through an air separator and a dust collector. The resulting concentrates, containing 40% to 45% $B_2O_3$, were sent to a reaction vessel and mixed with a wash liquor from the process into a slurry or sludge containing about 200 grams per liter as boric acid. Sufficient acid or salt was added to maintain a solution of calcium chloride or equivalent equal to about 15 grams per liter. This sludge was then treated with sulphur dioxide. The absorption of the sulphur dioxide was very rapid. Sufficient sulphur dioxide was added to maintain the desired pH as will be presently explained.

The reacted sludge was then allowed to settle in a thickener, the decant portion being passed through a pressure filter and then cooled. During cooling the boric acid crystallized out of the solution and was recovered by centrifuging, filtration or other suitable means. The boric acid was then washed free of adhering liquor and dried. The resulting product was a commercial product of high purity.

The waste solids from the reacting vessels are separated from the concentrated hot liquor by filtration or by countercurrent washing or by other suitable means. In any case, the washings and end liquors can be used over again to make up the reacting sludge. Impurities in the mother liquor are low due to the low solubility of most sulphites.

In this process heat from the burning sulphur was utilized to warm the solutions. Waste heat from the calcining process can also be utilized along with the waste dust which is high in $B_2O_3$ content. This is accomplished in a heat exchange dust scrubber. If this heat is not sufficient, additional heat must be supplied to the solution.

It is desirable to maintain a pH of about 4.5 in the reaction vessel when this is at a temperature of about 70° C. At this temperature and at this pH, the presence of a small amount of calcium chloride make the odor of sulphur dioxide from the solution almost imperceptible.

The pH of the slurry must be controlled and maintained between certain limits at any given temperature of operation. This relation is shown in Figure 2 for the range of 25° to 70° C.; the relation outside of this range can be secured by extrapolation. Generally the pH should be between 5.8 and 5.4 at 25° C. and between 4.7 and 4.3 at 70° C., the preferred values at these temperatures being respectively 5.6 and 4.5. The sulphur dioxide should be added at a rate sufficient to maintain the pH within the indicated range at any given temperature of operation. If the pH falls outside of the indicated range, then the sulphur dioxide liberation occurs and the calcium oxide concentration increases so that the yield of boric acid falls off.

By way of a specific example illustrating practice of the invention, a 3000 gram sample of raw ore was calcined to give 1200 grams of waste material and 1300 grams of concentrates which analyzed 45% $B_2O_3$. These concentrates were mixed with sufficient mother liquor (from previous runs) to give a concentration equal to 200 grams per liter as boric acid. There was already an equivalent of 15 grams per liter as $CaCl_2$ present in the mother liquor. This sludge, at 70° C. was treated with $SO_2$ from a sulphur burner until the pH reached 4.5; it was maintained at this pH, with constant agitation, for 45 minutes in order to complete the reaction. There was no objectionable odor of $SO_2$ during the process.

This reacted sludge was then filtered and the filtered waste was washed with warm water. The resulting filtrate was cooled and the boric acid crystallized upon cooling. The boric acid was separated by centrifuging, washed free of adhering mother liquor, and dried.

In another instance 190 grams of calcined colemanite was mixed with 2000 cc. of end liquor. Enough magnesium nitrate was added to give a concentration equal to 20 grams per liter as $Mg(NO_3)_2$. This was treated with sulphur dioxide from a sulphur burner—29.5 grams of sulphur were burned during treatment. The pH was maintained at 5.4 and the temperature was kept at 35° C. After reacting for 45 minutes, the material was heated to 70° C. and filtered. The filter cake was washed with warm water. The filtrate was cooled by vacuum to 30° C. and the boric acid was crystallized. This was separated by filtration and the boric acid washed free of adhering mother liquor and dried. The yield was 145 grams of boric acid. There was no objectionable odor of $SO_2$ during the reaction.

With magnesium nitrate the reactions can be represented thusly:

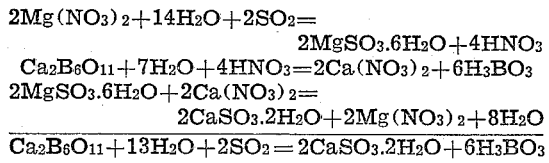

Using a continuous cyclic system conducted in accordance with this invention the raw ore was fed to the calciner at the rate of 13,000 lbs. per hour. The waste was discarded at the rate of 6000 lbs. per hour. The balance was fed to the reactors. Sulphur was burned at the rate of 830 lbs. per hour and the sulphur dioxide was supplied to the reactors. The reaction vessels were maintained at a pH of 4.5 by the control of the amount of sulphur dioxide being supplied to them. Their temperature was maintained at 70° C. The equivalent of 15 grams per liter as $CaCl_2$ was maintained in the reaction vessels by the occasional addition of HCl. The average retention time in the reaction vessels was 45 minutes to one hour.

After reacting the material was fed to a thickener. The waste solids (underflow) was washed free of boric acid values in a counter current washing system. Losses in the dried waste solids were less than 1% $B_2O_3$. Overflow from the thickener was passed through a clarifying filter and cooled in a crystallizer where the boric acid crystallized. The boric acid was subsequently separated from the mother liquor in a basket type centrifuge, washed with fresh water and dried. The dried product was produced at the rate of 4200 lbs. per hour.

I claim:

1. A process for manufacture of boric acid from calcium borate comprising adding to a slurry of calcium borate, maintained at a temperature within the range of about 25° C. and about 70° C. and containing a water soluble salt of an alkaline earth metal, sulfur dioxide to maintain a pH in the slurry progressively decreasing with increasing temperature from about 5.8 at 25° C. to about 4.5 at 70° C. until formation of boric acid in the slurry is substantially complete, and recovering the boric acid, the quantity of a water soluble salt in the slurry being sufficient to prevent liberation of sulfur dioxide as such from the slurry.

2. A process for manufacture of boric acid from calcium borate comprising adding to a slurry to calcium borate, maintained at a temperature within the range of about 25° C. and about 70° C. and containing about 15 grams per liter of a water soluble salt of an alkaline earth metal, sulfur dioxide to maintain a pH in the slurry progressively decreasing with increased temperature from about 5.8 at 25° C. to about 4.5 at 70° C. until formation of boric acid in the slurry is substantially complete, and recovering the boric acid.

3. A process for manufacture of boric acid from calcium borate comprising adding to a slurry of calcium borate, maintained at a temperature within the range of about 25° C. and about 70° C. and containing about 15 grams per liter of calcium chloride, sulfur dioxide to maintain a pH in the slurry progressively decreasing with increasing temperature from about 5.8 at 25° C. to about 4.5 at 70° C. until formation of boric acid in the slurry is substantially complete, and recovering the boric acid.

4. A process for manufacture of boric acid from calcium borate comprising adding to a slurry of calcium borate, maintained at a temperature within the range of about 25° C. and about 70° C. and containing about 15 grams per liter of calcium nitrate, sulfur dioxide to maintain a pH in the slurry progressively decreasing with increasing temperature from about 5.8 at 25° C. to about 4.5 at 70° C. until formation of boric acid in the slurry is substantially complete, and recovering the boric acid.

5. A process for manufacture of boric acid from calcium borate comprising adding to a slurry of calcium borate, maintained at a temperature within the range of about 25° C. and about 70° C. and containing about 15 grams per liter of magnesium chloride, sulfur dioxide to maintain a pH in the slurry progressively decreasing with increasing temperature from about 5.8 at 25° C. to about 4.5 at 70° C. until formation of boric acid in the slurry is substantially complete, and recovering the boric acid.

JAMES WISEMAN.

REFERENCES CITED

The following references are of record in the file of this patent:

UNITED STATES PATENTS

| Number | Name | Date |
|---|---|---|
| 1,108,129 | Burger | Aug. 25, 1914 |
| 1,642,535 | Blumenberg | Sept. 13, 1927 |

FOREIGN PATENTS

| Number | Country | Date |
|---|---|---|
| 22,714 | Great Britain | Oct. 7, 1893 |